G. J. SEISS.
MECHANICALLY ACTUATED HORN.
APPLICATION FILED APR. 30, 1918.
1,348,377.
Patented Aug. 3, 1920.
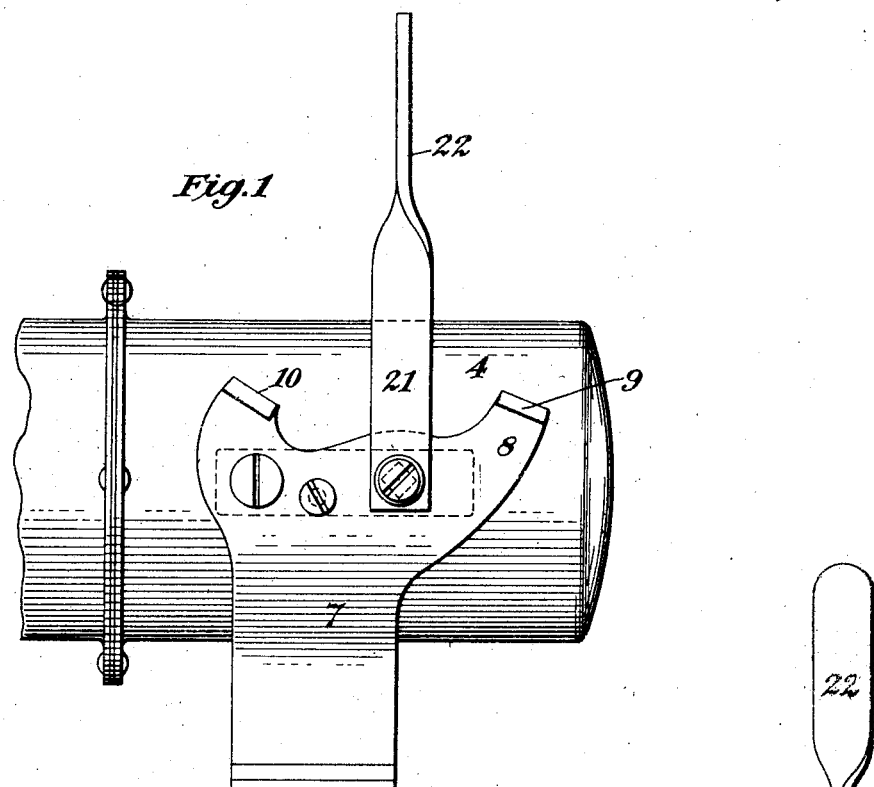
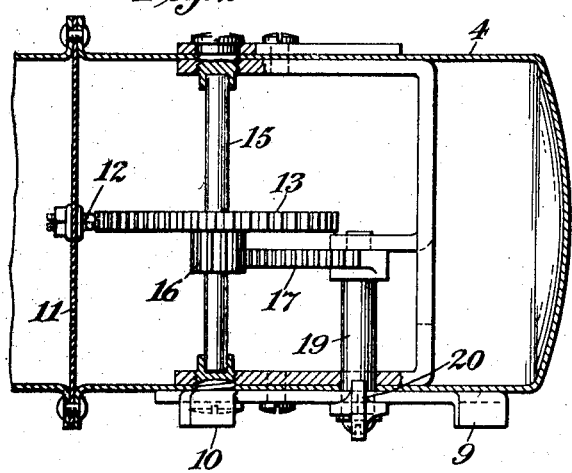
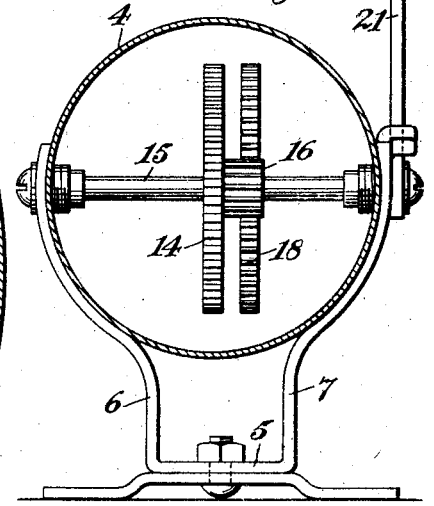

UNITED STATES PATENT OFFICE.

GEORGE J. SEISS, OF TOLEDO, OHIO.

MECHANICALLY-ACTUATED HORN.

1,348,377.           Specification of Letters Patent.     Patented Aug. 3, 1920.

Application filed April 30, 1918. Serial No. 231,729.

*To all whom it may concern:*

Be it known that I, GEORGE J. SEISS, a citizen of the United States, residing at Toledo, in the county of Lucas and State of Ohio, have invented certain new and useful Improvements in Mechanically-Actuated Horns, of which the following is a specification.

Devices of this kind with which I am familiar are subject to the objection that the stop provided for the actuating mechanism is generally a part of the actuating mechanism, with the result that in a comparatively short time the shock is so detrimental as to render the mechanism inoperative.

My invention has for its object to provide a device in which the shock for stopping the operating lever will be entirely carried by the supporting member and regardless of how violently the actuating lever may be pulled or kicked it will not injure or render inoperative the entire mechanism.

My means of accomplishing the foregoing objects may be more readily understood by having reference to the accompanying drawings which are hereunto annexed and are made a part of this specification, in which:

Figure 1 is a side elevation of a horn provided with my improvement.

Fig. 2 is a longitudinal sectional view.

Fig. 3 is a vertical cross section.

Similar reference numerals refer to similar parts throughout the entire description.

As shown in the drawings, the horn comprises a cylindrical body portion 4 carried by a supporting frame 5, which is provided with two upwardly extending arms 6 and 7 which are fitted to and coincide with the exterior wall of the cylindrical body portion. The arm 7 is provided with a rearwardly extending member 8 which is provided with a laterally extending lug or shoulder 9. A corresponding shoulder or lug 10 is formed at the forward part of the arm 7.

A diaphragm 11 of the usual form is secured in the cylindrical body portion and is provided with a central wear piece 12 which is adapted to engage the teeth 13 formed on the periphery of the wheel 14, mounted upon a shaft 15. Adjacent the wheel 14 is a pinion 16 which is fixedly secured to the wheel, the teeth of which are in mesh with the teeth 17 of a gear segment 18 carried by a shaft 19, the outer end 20 of which has rigidly secured thereto, an operating lever 21.

It will be apparent from the foregoing description that reciprocating movement imparted to the handle 22 of the lever 21 will rock the gear segment 18 and in turn cause the pinion to be rotated backward and forward upon the shaft 15 causing the teeth of the wheel 14 to engage the wear piece 12 on the diaphragm. At the same time the movement of the lever 21 both forward and backward is controlled by the lugs 9 and 10 which, as clearly shown by the drawings, are a part of the supporting frame 5 and is not in any way connected to the horn mechanism.

The result of this construction is that an exceedingly durable horn is produced, and one which is not easily gotten out of order through usage.

Although I have described a specific form of construction for my improvement, I desire to be understood that it is merely the preferred form, as many devices in detail can be made without departing from the scope of my invention.

Having described my invention, what I regard as new and desire to secure by Letters Patent is:

1. In a signal, a hollow body, a diaphragm therein, a bracket having arms partially embracing the body, a shaft rotatably mounted in the body and having means for vibrating the diaphragm, a manually operated oscillatable device having means for rotating the shaft, a member on the rearward end of one of the arms, a member on the forward end of said arms, and projections on the said members to engage and limit the movement of said oscillatable device.

2. In a signal, a hollow body having sounding means therein, a shaft for actuating the sounding means, an oscillatable handle on said shaft, a bracket having arms partially embracing the body and secured thereto, a rearward extension on one arm on one side of the handle, a forward extension on the arm at the opposite side of said handle and handle abutting devices on the said extensions.

In testimony whereof I have signed the foregoing specification.

GEORGE J. SEISS.